3 Sheets—Sheet 1.

F. BLAKE.

Individual Call Bell.

No. 9,749. Reissued June 7, 1881.

Witnesses:

W. W. Swan

H. G. Olmsted

Inventor:

Francis Blake

F. BLAKE.

Individual Call Bell.

No. 9,749. Reissued June 7, 1881.

*Witnesses:*
W. W. Swan
H. G. Olmsted

*Inventor:*
Francis Blake.

F. BLAKE.

Individual Call Bell.

No. 9,749. Reissued June 7, 1881.

Witnesses:
W. W. Swan
H. G. Olmsted

Inventor:
Francis Blake

UNITED STATES PATENT OFFICE.

FRANCIS BLAKE, OF WESTON, MASSACHUSETTS.

INDIVIDUAL CALL-BELL.

SPECIFICATION forming part of Reissued Letters Patent No. 9,749, dated June 7, 1881.

Original No. 232,442, dated September 21, 1880. Application for reissue filed April 26, 1881.

*To all whom it may concern:*

Be it known that I, FRANCIS BLAKE, of Weston, Massachusetts, have invented a new and useful Improvement in Individual Call-Bells, of which the following is a specification.

The invention consists in the employment of a number of synchronously-revolving dials under the control of a battery-current upon a single circuit, but acting automatically, each at a separate time, to ring a magneto-bell by diverting through or grounding through the magneto-bell a magneto-current generated at the central office, in combination with a device under the control of the operator at the central office, by which the automatic operation of the dial at the central office may be made to coincide with the automatic operation of the dial at either of the out-stations.

It also consists in a device for showing when the line is in use.

It consists, further, in certain details of construction.

Figure 2:
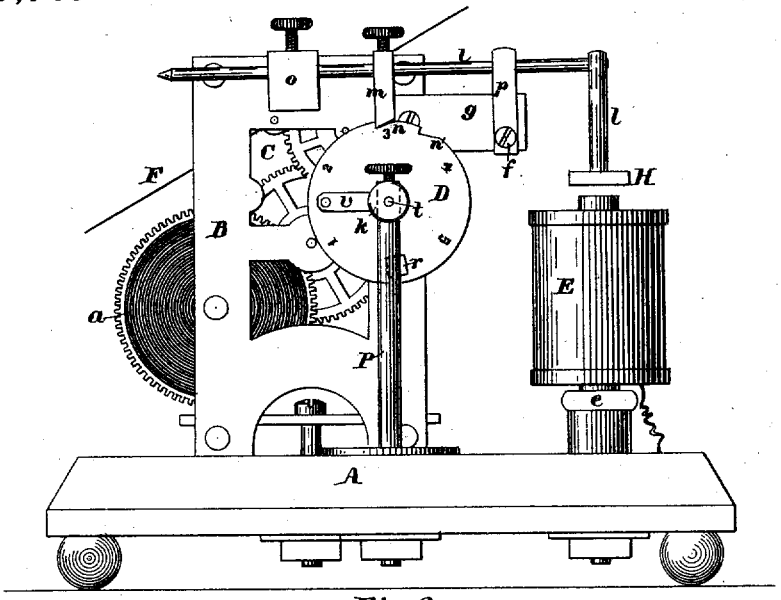
Figure 1:
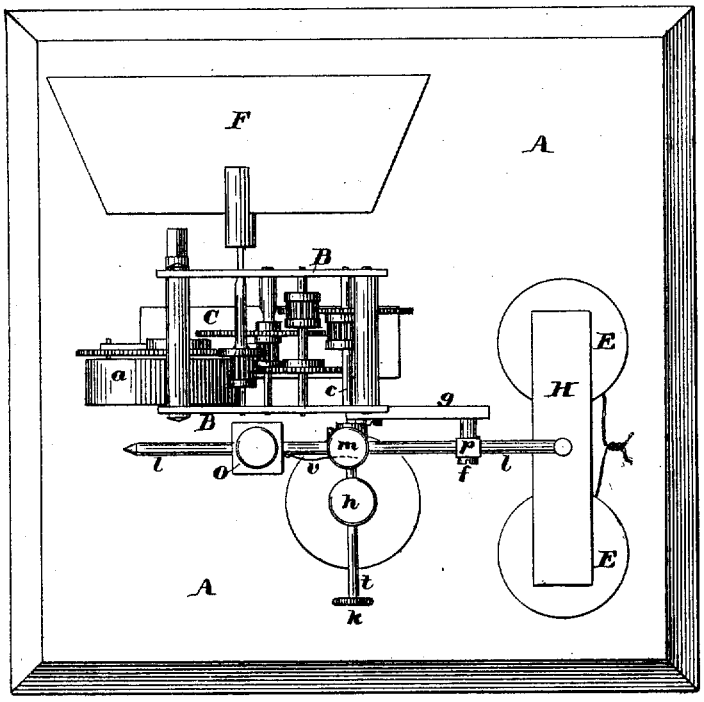
Figure 3:
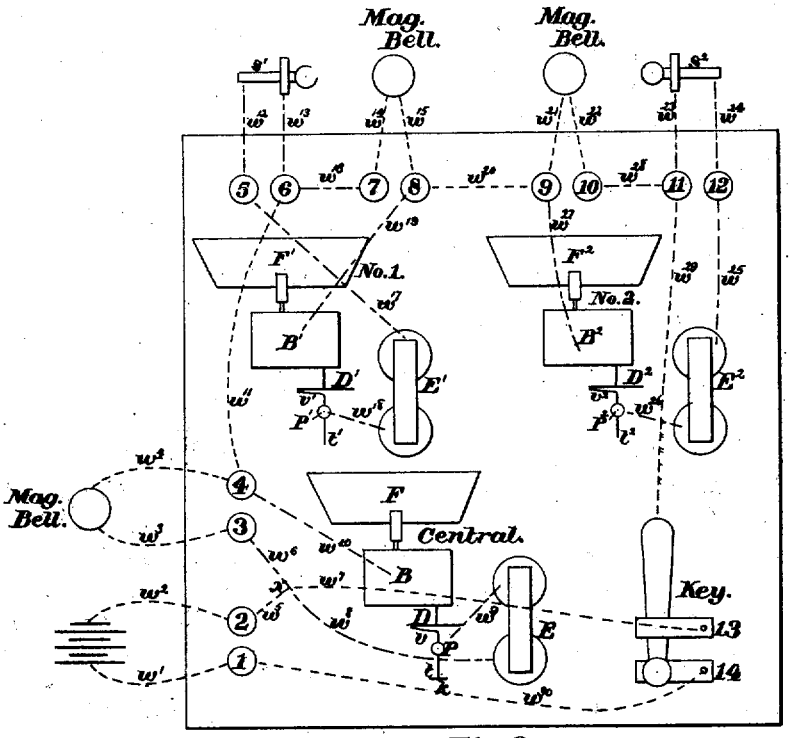
Figure 4:
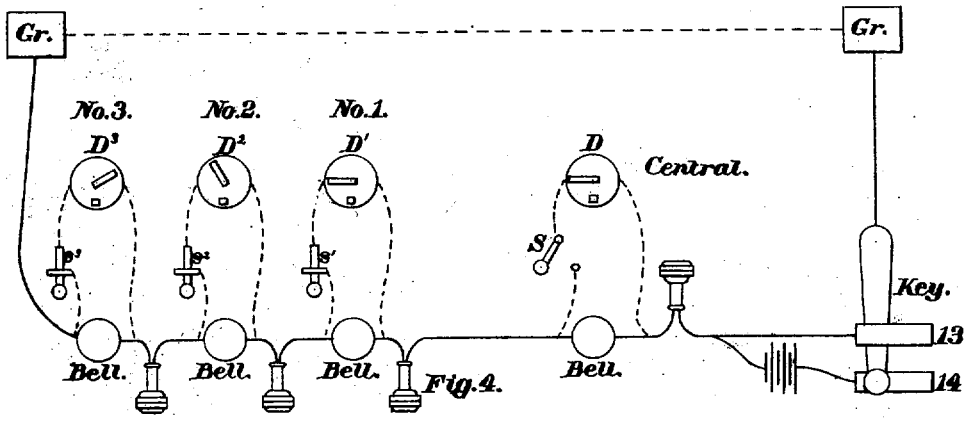
Figure 5:
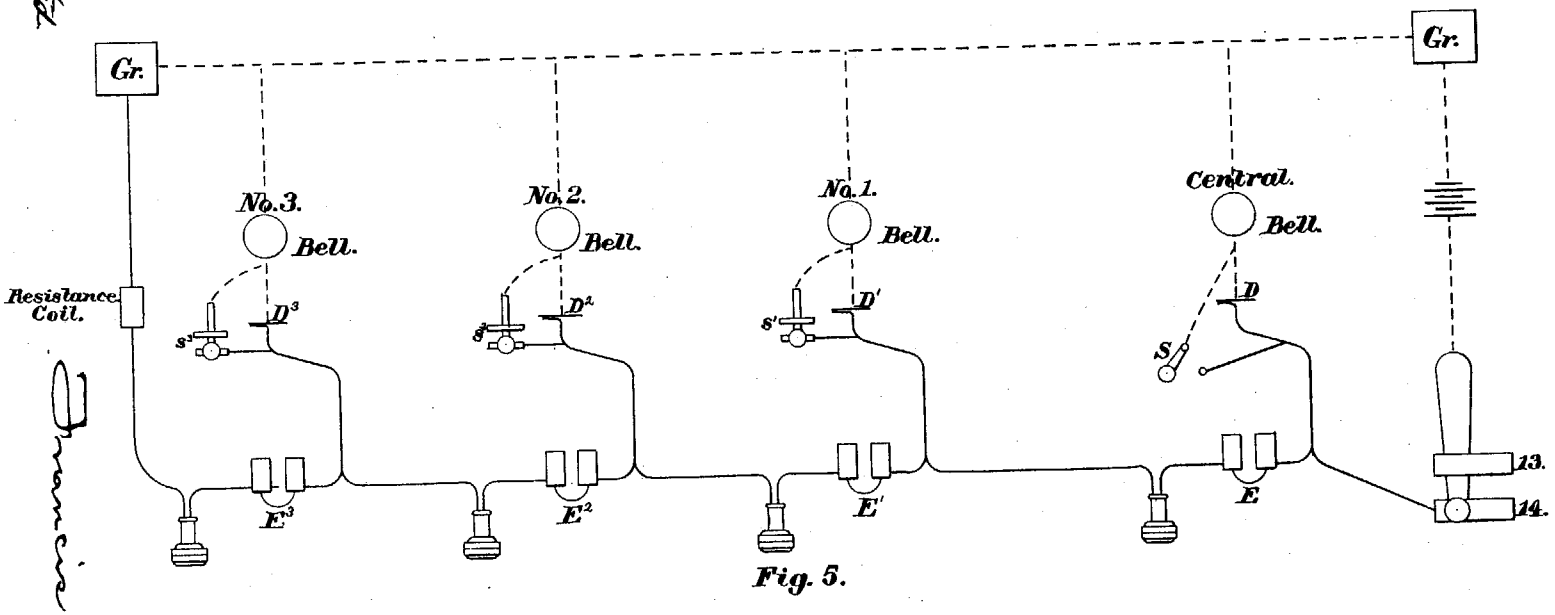

In the drawings, Figure 1 is a plan, and Fig. 2 a front elevation, of an instrument employed in carrying out my invention. Fig. 3 is a diagram showing the circuit and branches when the invention is applied to a group consisting of a central station and two out-stations, the magneto-bell to be rung by diverting a magneto-current through it. Fig. 4 is a diagram in further explanation of the working of the invention. Fig. 5 is a diagram in explanation of the working of the circuit when the magneto-bells of the out-stations are to be rung by grounding through them the magneto-current generated at the central station.

There is but a slight difference in the construction of the instruments between those adapted to circuits in which the magneto-bell is to be rung by diverting a magneto-current and those belonging to circuits in which the magneto-current is to be grounded.

The instrument will first be described as belonging to a circuit of the former kind.

A is a wooden table. B is a brass frame for a train of wheels or ordinary clock-work, C, operated by a coiled spring, *a*. D is a dial upon a shaft, *c*, revolving by the clock-work. F is a governing-fan. E is an electro-magnet mounted upon a block, *e*. H is its armature, rigidly secured to a weighted bell-crank lever, *l*, which, in turn, is rigidly secured to a post, *p*, rocking on a pin, *f*, inserted in an arm, *g*, projecting from the brass frame B. The bell-crank lever carries a catch, *m*, which takes into a notch, *n*, in the periphery of the dial D, and also a weight, *o*, sufficiently heavy to lift the armature when not attracted by the electro-magnet. The dial D has a second notch, *n'*, for a purpose to be hereinafter mentioned.

When the instruments are used in circuits in which the magneto-current is to be diverted through the bell, the dial is of metal, and has a slot which is filled with a hard-rubber plug, *r*. When the instrument is to be used in circuits in which the magneto-current is to be grounded, the dial D is of hard rubber and the plug *r* is of metal.

P is a brass post in front of the dial, furnishing a bearing for a metallic shaft, *t*, carrying a hand or pointer, *v*. This hand is an electrode, and is furnished with a platinum point which is at all times in contact with the dial, the plug *r* coming in contact with it at each revolution of the dial. The shaft *t* has a milled head, by which it may be turned, and it is locked in any required position by a thumb-screw, *h*.

In the diagram Fig. 3, B represents the brass frame with its train of wheels, D the brass dial, P the post in front of the dial, *t* its shaft, *v* the hand, and E the electro-magnet, all as in the instrument above described. B', D', P', *t'*, *v'*, and E' represent like parts of a similar instrument at station No. 1, and $B^2$, $D^2$, $P^2$, $t^2$ $v^2$, and $E^2$ like parts of a similar instrument at station No. 2.

The dials should be graduated according to the number of stations, and each station have its own number, its hand being turned to point to that number and there locked. That the hands may not get misplaced, the milled heads may be removed from the shafts to which the hands are attached at the out-stations.

Each station, including the central station, is provided with a magneto-bell, including a magneto-electric machine on the main line; and the central station is furnished with a battery, as indicated, and a key the spring-arm of which, in its normal condition, is in contact with plate 13, but which, when depressed, is in contact with plate 14.

Each station is provided with four screw-cups, which, for convenience, are numbered in one series from 1 to 12. At the central station cups 1 and 2 are connected with the battery by wires $w'$ and $w^2$, and cups 3 and 4 connect with a magneto-bell by wires $w^3$ and $w^4$. Wires leading from cups 2 and 3, from plate 13, and from one spool of the electro-magnet E, unite, as shown at $x$, and are marked $w^5$, $w^6$, $w^7$, and $w^8$. The other spool of the electro-magnet E is connected by wire $w^9$ with post P, while wire $w^{10}$ connects the brass frame, including its clock-work C, with cup 4. A line-wire, $w^{11}$, connects cups 4 and 6, thus uniting the central station with station No. 1. At station No. 1 wires $w^{12}$ and $w^{13}$ connect cups 5 and 6 with a break-circuit key, $s'$, belonging to the station, to be used in giving a return-signal, as will be hereinafter described. Wires $w^{14}$ and $w^{15}$ connect cups 7 and 8 with a magneto-bell, and wire $w^{16}$ connects the two cups 6 and 7. Wire $w^{17}$ connects cup 5 with a spool of an electro-magnet, E′, the other spool being connected by wires $w^{18}$ with post P′, while wire $w^{19}$ connects brass frame B with cup 8. A line-wire, $w^{20}$, connects stations No. 1 and No. 2 or cups 8 and 9. At station No. 2 wires $w^{21}$ and $w^{22}$ connect cups 9 and 10 with the magneto-bell. Wires $w^{23}$ $w^{24}$ connect cups 11 and 12 with the break-circuit key $s^2$. Wire $w^{25}$ connects cup 12 with one spool of electro-magnet $E^2$. Wire $w^{26}$ connects the other spool with post $P^2$, and wire $w^{27}$ connects brass frame $B^2$ with cup 9. Wire $w^{28}$ connects cups 10 and 11, the latter cup being grounded, as is likewise the spring-arm of the key at the central station. In the diagram, $w^{29}$ represents the ground part of the circuit, and wire $w^{30}$ connects the key with cup 1.

It is evident from the above description that at each station, including the central station, the circuit is divided, one portion passing merely through the magneto-bell, while the other passes through the electro-magnet and the dial-instrument.

It should be added that the battery-current is to be used simply for operating the dial mechanism, the bells being rung by a magneto-current, and that the resistances of the different branches of the circuit at each station are such that the bell will not ring while the current is divided at that station.

The battery-current is used as follows: In the normal condition of the line it is off, the arm of the key being in contact with the plate 13. In the normal condition of the instrument at the central station the hand $v$ is on the plug $r$, for a reason to be hereinafter stated; but when the operator at the central station is about to put on the battery he turns his hand $v$ so that it is no longer in contact with the plug $r$, but is in contact with the dial at the graduation thereof which corresponds with the position of the hand at the out-station he wishes to call. Then depressing the key and bringing in the battery, the circuit is from the ground-key, through line $w^{30}$, to cup 1, through the battery, by wires $w'$ and $w^2$, to cup 2, to junction $x$, where it divides, a portion passing by wire $w^8$ through the electro-magnet, and by wire $w^9$, post P, shaft $t$, hand $v$, dial D, brass frame B, and wire $w^{10}$ to cup 4, whence it passes through the other stations to ground, as will be hereinafter shown. The other portion of the current passes from junction $x$, by wire $w^6$, to cup 3, and by wires $w^3$ and $w^4$, through the magneto-bell, to cup 4, on to the other stations and ground. From cup 4 the battery-current is by line-wire $w^{11}$ to cup 6 in station No. 1, where it again divides, a portion passing through wire $w^{16}$ to cup 7, whence, passing through the magneto-bell by wires $w^{14}$ and $w^{15}$, it passes to cup 8, on to the next station and ground, the other portion passing from cup 6, by wires $w^{13}$ $w^{12}$, through the break-circuit key $s'$, to cup 5, and then through the dial-instrument, by $w^{17}$ E′ $w^{18}$ P′ $t'$ $v'$ D′ B′ $w^{19}$, to cup 8, on to the next station and to ground. Entering the next station at cup 9, the current divides, a portion passing through the magneto-bell and on to grounded cup 11 by $w^{21}$, $w^{22}$, 10, and $w^{28}$, and a portion passing through the dial-instrument and break-circuit key to grounded cup 11 by $w^{27}$ $B^2$ $D^2$ $v^2$ $t^2$ $P^2$ $w^{26}$ $E^2$ $w^{25}$ 12 $w^{24}$ $s^2$ $w^{23}$ When a single impulse of the battery-current is sent through the line the electro-magnet at each station attracts its armature, and thereby momentarily lifts the stop from the notch $n$ in the dial and allows the dial to be revolved by the clock-work, and the dial will continue to revolve until the stop resting upon the periphery of the dial falls into the notch $n'$, or, if $n'$ be omitted, for a single revolution.

The magneto-bells are of ordinary construction; but the invention may be more easily understood if the connections of the magneto-generator and of the electro-magnet which operate the bell-striker at each station are stated. They are as follows: At the central station wires 3 and 4 may be considered as a single-line wire, in which are located the coil of the electro-magnet of the striker and a coil of the magneto-generator in such manner that these coils form a part of the line. In like manner wires 14 and 15 may be considered as a single-line wire at station 1, and wires 22 and 21 a single-line wire at station 2, each having located in it, in like manner, corresponding coils. The circuits for the magneto-currents remain the same as the battery-circuits, and it follows that a magneto-current generated at the central station may be divided at cup 4, a portion being short-circuited through the dial-instrument, or it may all pass over line-wire $w^{11}$ to station 1. In like manner a magneto-current, of whatever strength, which has passed over wire 11 to station 1 may be divided at cup 6, a portion being short circuited through the dial-instrument and magneto apparatus at that station; or it may all pass through the magneto apparatus at that station, and on over wire $w^{20}$ to station No. 2, where it may, in like manner, be partly short-circuited or wholly passed through the magneto apparatus to ground; but, as before stated in substance, the resistances are such that the bell at no station can be rung unless the full magneto-current, wherever generated, passes through the magneto apparatus of that station. It follows that if the magneto-current generated at the central station be divided at that station it will not ring its own bell; and it is obvious that if a magneto-current generated at the central station cannot ring its own bell it will not have sufficient strength to ring the bell of another station, whether the short circuit at that other station be established or broken. In other words, the short circuits through the dial-instruments of both the central station and of an out-station must both be broken in order to ring the bell at the out-station by a magneto-current generated at the central station. Now, the dials are all graduated, as before stated, and each station has its number. The normal position of the hand at each station is upon the figure of the dial designating the number of the station, and at each revolution of the dial of any station, when the hand $v$ comes in contact with the plug $r$, the short circuit through the dial is broken. It follows that the operator at the central station, knowing the position of the hands at the other stations, can set his own hand to coincide with any one of the other hands, and that, generating a magneto-current by his magneto-generator, he can send that current through his own magneto-bell and through the magneto-bell of that station whose hand so coincides with the hand at the central station. Those two bells will ring, and those only, for at all other stations the magneto-current will be short-circuited. Accordingly, to call an out-station the operator at the central station will set the hand of his dial to correspond with the hand of dial of the station he wishes to call, send a single impulse of the battery-current through the line, and then generate a magneto-current. The single impulse of the battery-current will set all the dials in motion, and the bells of the central station and the called station will ring at the same instant, which will be when the plugs of the dials of the two instruments come under their respective hands.

It is obvious that the operator at any out-station may call the central station by generating a magneto-current with the generator of his magneto-bell, provided he can break the short circuit through his dial-instrument; but since his dial is under the control of the battery-current, which is operated from the central office, it becomes necessary to furnish the short circuit at each out-station with a circuit-breaker, as shown at $s'$, $s^2$, and, Fig. 4, $s^3$.

A simple illustration of the invention as operated in a telephone-circuit consisting of a central and three out stations is shown at Fig. 4, in which the full line represents the main circuit passing through the magneto-bells, as above described, and also through the telephones, while the dotted lines belong to the short circuits, containing the dials and break-circuit keys.

As shown in Fig. 4, the hand at the central station has been set to coincide with the hand at station 1. To ring the central and No. 1 bells, the operator at the central station will close the switch S and generate a magneto-current with his magneto-generator. The normal position of the hand at central station is shown in dotted lines at Fig. 4—that is, it is upon the plug—and the short circuit is broken. If the operator at station 1 wishes to call the central station, he has merely to break his own short circuit and operate his magneto-generator. The switch S at the central station is unnecessary, but is provided in order that the central station may be called even if, through mistake or otherwise, the hand is not upon the plug.

In Fig. 5, as before stated, the invention is illustrated as used when the magneto-current is grounded through the magneto-bells. The dials are then of hard rubber and the plug of metal, and there can be no current of either description through the bell of any station unless the hand at that station is on the plug of the dial, and as the hand at no station in its normal position is on the plug the battery-current passes through the electro-magnets E of the dial-instruments, and a single impulse will set the dials in motion, as heretofore described. When the circuits are arranged as shown in Fig. 5 there is no connection between the plate 13 and the line, and in the normal condition of the line the current is broken at the key. The devices shown at $s'$, $s^2$, and $s^3$, instead of being circuit-breakers, are circuit-makers.

In this system, as worked with grounded bells, a resistance-coil is placed in the main line, beyond the farther station, of such power that a magneto-current generated upon the line will pass through an intervening magneto-bell to ground whenever an opportunity offers, and this happens whenever the hand at a station is on the plug.

The operation is as follows: The operator at the central station, wishing to call another station, sets the hand at his station so that it points in the same direction as the hand at the station he wishes to call. Touching the key, he then sends a single impulse through the line, setting all the dials in motion, when he generates a magneto-current in his magneto-machine. It is obvious that this magneto-current can be established on the main line only when the plug comes under the hand at the central station; and it is also obvious that it will ground through the bell at that station the plug of whose dials comes under the hand at the same time. When grounded bells are used the hand is upon the plug at the central station, or the switch S is closed, so that the bell may be rung by any person generating a magneto-current at any out-station.

The notch *n'* prevents the dial from making a full revolution, and when the catch *m* is in the notch *n* it is evident that the plug *r* will be in a different position from that which it occupies when the catch is in the notch *n*. Use is therefore made of this device as a "line-in-use" signal. The operator at the central station allowing all the catches to remain in the notches *n'* while the line is in use, the person at the out-station, seeing that his own plug is out of its normal place, will know that the line is in use.

It is obvious that in this system either station may be used as a central station, provided it has a suitable battery and key—that is, the bell of any station may be rung from any other station.

I claim—

1. A number of synchronously-revolving dials controlled by a battery-current, but acting automatically, each at its own time, to ring a magneto-bell by diverting through or grounding through the magneto-bell a magneto-current generated at a distant office, in combination with an automatic device under control of the operator at the distant office, by which the automatic operation of the dial at the distant office may be made to coincide with the automatic operation of either of the other dials.

2. In combination with a battery, suitable wires, and a magneto-bell, the hand *v*, electro-magnet E, armature H, provided with a catch, *m*, and dial D, provided with notch *n* and plug *r*, the dial or plug forming one electrode and the hand a second electrode, substantially as described, for the purpose specified.

3. At each of a number of stations on a telephone or telegraph line, a dial revolved by its own clock-work, and provided with two notches or stops located relatively to each other, and working in combination with the weighted armature of an electro-magnet, substantially as described, to show at any and all the stations whether or not the line is in use.

4. The hand *v*, electro-magnet E, armature H, and catch *m*, and the dial D, train C, normally at rest, notch *n*, and plug *r*, in combination with a main circuit and a branch or grounding circuit, the electro-magnet being in the main circuit, and the dial or plug forming one electrode, while the hand *v* forms the second electrode in the main or grounding circuit, substantially as described.

5. A dial provided with and revolved by a clock-work normally at rest, and an electro-magnet and armature controlling said dial and clock-work, in combination with a main circuit, a branch or grounding circuit, two electrodes, one moving with the dial and clock-work and the other stationary, suitable resistances, and an alarm-bell in the branch or grounding circuit, the electro-magnet which controls the dial and clock-work being in the main circuit, all substantially as described, so that when the dial is set in motion under a single impulse sent through the electro-magnet it will make substantially one complete revolution, during which it will act automatically to shunt the electro-magnet or ground the main line and ring the alarm-bell by diverting through or grounding through the bell-circuit a current generated upon the main line.

6. A number of stations in a single electric circuit, and, in combination with said electric circuit, at each station a branch or grounding circuit, an alarm-bell in said branch or grounding circuit, a dial and clock-work, and an electro-magnet in the main circuit controlling the dial and clock-work, all the dials with their clock-works being normally at rest, substantially as described, so that when the dials are released by their respective electro-magnets under a single impulse thrown upon the line they will turn freely and synchronously for substantially one complete revolution, during which they will act automatically, each at its own time, to ring their respective alarm-bells by shunting their respective electro-magnets and diverting through the bell-circuit a current generated upon the main line, or by grounding said current through the bell-circuit.

7. A number of stations in a single electric circuit, and, in combination with said electric circuit, at each station a branch or grounding circuit with a magneto-bell therein, a dial provided with and driven by a clock-work, an electro-magnet in the main circuit controlling said dial and clock-work, and two electrodes, one of which is in the dial and the other adjustable, the said dials being normally at rest, all substantially as described, so that when the dials are released by a single impulse of a battery-current thrown upon the line they will all turn freely and synchronously for a single revolution, during which they will act automatically, any two of them, but those two only whose adjustable electrodes are similarly placed, to ring their respective magneto-bells by shunting their respective electro-magnets and diverting through the magneto-bells a magneto-current generated upon the line, or by grounding said magneto-current through the magneto-bells.

FRANCIS BLAKE.

Witnesses:
W. W. SWAN,
H. G. OLMSTED.